N. ROUSSEAU.
BIB COCK.
APPLICATION FILED NOV. 3, 1920.

1,371,575.

Patented Mar. 15, 1921.

Inventor;
Nectaire Rousseau

UNITED STATES PATENT OFFICE.

NECTAIRE ROUSSEAU, OF CHICAGO, ILLINOIS.

BIB-COCK.

1,371,575.   Specification of Letters Patent.   Patented Mar. 15, 1921.

Application filed November 3, 1920. Serial No. 421,460.

*To all whom it may concern:*

Be it known that I, NECTAIRE ROUSSEAU, a citizen of the United States, residing at Chicago, in the county of Cook and State of Illinois, have invented certain new and useful Improvements in Bib-Cocks, of which the following is a specification.

The invention relates to improvements in bib cocks.

One of the objects of the invention is to provide an improved valve for bib cocks.

Another object is to provide a spring-pressed valve to take the place of the usual yielding perishable Fuller ball, generally used in cocks of this character.

Another object is to provide a spring-pressed valve and a casing to inclose the spring, stem and adjusting nut in a water-tight chamber behind the valve.

Another object is to provide a spring-pressed valve and an inclosing casing that moves with the valve and serves as a backing for the valve.

Another object is to proide a spring-inclosing casing and a cover cap that is held securely in place by the water pressure to which it is subjected.

Another object is to provide a spring-pressed valve slidable on a supporting stem and sealing the opening between the valve and the stem by a spring-pressed casing which also serves as a backing for the valve.

Another object is to provide a casing, for the purpose described, consisting of two cup-shaped members telescopically engaging the pressure of the water tending to maintain the casing closed.

Other, further and more specific objects of the invention will become readily apparent, to persons skilled in the art, from a consideration of the following description, when taken in conjunction with the drawings, wherein:—

In both views the same reference characters are employed to indicate similar parts.

Figure 1:
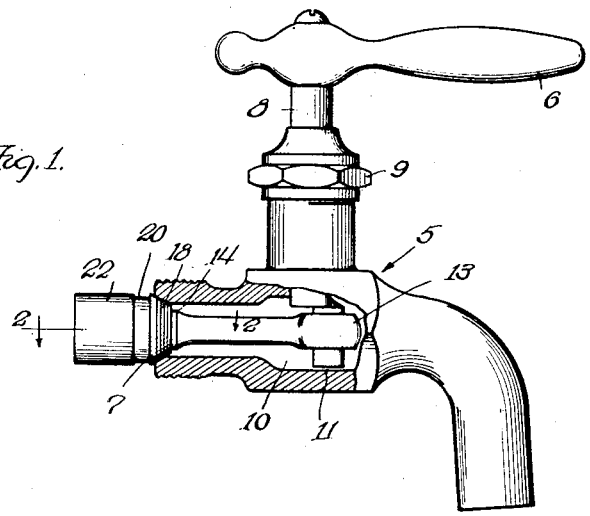
Figure 1 is a side elevation of a bib-cock, parts being shown in section.
Figure 2:
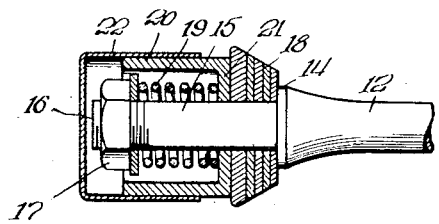
Fig. 2 is a section through the valve member taken on line 2—2 of Fig. 1.

The valve herein shown is made of disks of leather formed into a frusto-conical structure or truncated cone, fashioned to fit the valve seat, but it may be made of one piece of rubber vulcanized to an extent so as to have very little inherent elasticity, not so much as in Fuller balls, which is best for withstanding the exacting and destructive effects of hot water. The invention, however, is not dependent upon the substance of the valve but is of such a character that any well adapted substance having more or less inherent elasticity than the usual Fuller ball may be employed.

The bib-cock 5, shown in the accompanying drawings, forming a part hereof, has a handle 6 rotatable to open and close the port 7. The stem 8, to the upper end of which is fixed the handle 6, passes through a stuffing box 9 into a chamber 10 in the body part of the cock and its lower end carries a crank 11.

A valve stem 12 is pivotally connected to the crank 11 at 13. On its outer end it bears a shoulder 14 and a reduced portion 15 which is threaded on its outer end 16 for an adjustable nut 17. The truncated conical valve 18 is centrally perforated to slip over 15 of the stem and is forced into contact with the shoulder 14 by the spring 19. A two part casing incloses the spring and nut. One cup-shape member 20 is centrally bored through its head to slide freely over the stem portion 15. The head 21 is forced into contact with the rear surface of the valve 18.

In operation, when the handle is rotated to close the port 7, the valve is seated on its port before the full throw of the crank is completed, whereupon further movement of the handle will permit continued movement of the stem 12 by compression of the spring 19 and thereby the valve is more firmly seated and this result is accomplished without inherent elasticity of the substance of the valve.

An imperforate cup-shape closure 22, telescopically engages the member 20 and forms therewith a completely closed casing. The closure is held in place by friction of the two members, the pressure of the liquid controlled by the bib-cock tending to supplement this effect; therefore water can not leak into chamber 10 between stem 15 and the valve.

Having described my invention what I claim as new and desire to secure by Letters Patent is:—

1. A bib-cock having in combination a body; a stem rotatable therein, a crank on the inner end of the stem within the chamber in the body; a valve seat at one end of the chamber; a valve stem pivoted to the crank and passing through the valve seat having a shoulder near the seat and a reduced part therebeyond; a valve, for closing the port through the valve seat, bodily movable on the reduced part of the stem and engageable with said shoulder; a cup-shape member having a perforated bottom directly mounted on the stem and backing up the valve; a spring surrounding the stem and within the member; a nut on the stem to adjust the tension of the spring and another cup-shape member overlying the first mentioned member to completely inclose the spring.

2. In a bib-cock, a valve stem having a shoulder at one end and a reduced part therebeyond; a valve directly mounted on said reduced part and normally in contact with the shoulder; a cup-shape casing member having a perforate end to move over the reduced part of the stem and to back the valve; a spring around the stem and within said casing member; a nut on the end of the reduced part of the stem to adjust the tension of the spring and an imperforate cap, telescopically engaging said casing member to inclose said spring, stem and nut and protect them from contact with the liquid controlled by the cock.

In testimony whereof I hereunto subscribe my name.

NECTAIRE ROUSSEAU.